United States Patent
Black (10) Patent No.: US 11,466,584 B1
(45) Date of Patent: Oct. 11, 2022

(54) CERAMIC RUNNER SEAL ASSEMBLY WITH COMPLIANT HOLDER

(71) Applicant: Rolls-Royce Corporation, Indianapolis, IN (US)

(72) Inventor: Joseph D. Black, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/388,203

(22) Filed: Jul. 29, 2021

(51) Int. Cl.
*F01D 11/02* (2006.01)

(52) U.S. Cl.
CPC .......... *F01D 11/02* (2013.01); *F05D 2220/32* (2013.01); *F05D 2230/60* (2013.01); *F05D 2240/55* (2013.01)

(58) Field of Classification Search
CPC ...... F01D 11/00; F01D 11/001; F01D 11/003; F01D 11/02; F05D 2220/32; F05D 2230/60; F05D 2240/55; F16J 15/44; F16J 15/441; F16J 15/445; F16J 15/453
See application file for complete search history.

(56) References Cited

U.S. PATENT DOCUMENTS

| | | | |
|---|---|---|---|
| 3,559,725 A | 2/1971 | Fucinar et al. | |
| 3,770,179 A | 11/1973 | McHugh | |
| 3,894,741 A | 7/1975 | McHugh | |
| 4,211,424 A * | 7/1980 | Stein | F16J 15/54 277/400 |
| 4,744,721 A | 5/1988 | Villeneuve | |
| 5,014,999 A | 5/1991 | Makhobey | |
| 5,039,113 A | 8/1991 | Gardner | |
| 5,344,161 A | 9/1994 | Sandgren | |
| 5,533,739 A | 7/1996 | Sedy | |
| 5,538,257 A | 7/1996 | Sandgren | |
| 5,626,347 A | 5/1997 | Ullah | |
| 6,132,168 A | 10/2000 | Kovaleski et al. | |
| 6,224,322 B1 | 5/2001 | Calboreanu | |
| 6,322,081 B1 | 11/2001 | Ullah et al. | |
| 7,175,388 B2 | 2/2007 | Labbe et al. | |
| 7,410,341 B2 | 8/2008 | Gockel et al. | |
| 7,549,836 B2 | 6/2009 | Anderson et al. | |
| 7,905,495 B2 | 3/2011 | Munson | |
| 8,690,159 B2 | 4/2014 | Peer et al. | |
| 9,359,912 B2 | 6/2016 | Ullah et al. | |
| 9,512,922 B2 | 12/2016 | Takeuchi et al. | |
| 10,174,845 B2 | 1/2019 | Fadgen | |
| 10,571,028 B2 | 2/2020 | Burnside et al. | |
| 10,907,437 B2 | 2/2021 | Guijun et al. | |
| 10,927,960 B2 | 2/2021 | Bernacchi et al. | |
| 10,935,142 B2 | 3/2021 | Bernacchi et al. | |
| 2002/0140177 A1 | 10/2002 | Murray | |
| 2003/0015842 A1 | 1/2003 | Wilhelm | |

(Continued)

FOREIGN PATENT DOCUMENTS

WO 2014143097 9/2014

*Primary Examiner* — Eldon T Brockman
*Assistant Examiner* — Elton K Wong
(74) *Attorney, Agent, or Firm* — Barnes & Thornburg LLP (57) ABSTRACT

A seal assembly adapted for use with a gas turbine engine includes a runner, a seal, and a compliant holder. The runner extends circumferentially about an axis and the compliant holder. The compliant holder engages the runner and is configured to support the runner radially relative to the axis. The seal extends circumferentially around the runner to block fluid flow through the seal assembly.

20 Claims, 7 Drawing Sheets

(56) References Cited

U.S. PATENT DOCUMENTS

| | | |
|---|---|---|
| 2007/0262532 A1 | 11/2007 | Ohama et al. |
| 2009/0142180 A1* | 6/2009 | Munson ............... F01D 11/003 277/307 |
| 2011/0250056 A1* | 10/2011 | Munson ............... F01D 11/003 415/170.1 |
| 2014/0265151 A1* | 9/2014 | Vasagar ............... F01D 11/003 277/500 |
| 2015/0115539 A1 | 4/2015 | Guenther et al. |
| 2019/0040959 A1 | 2/2019 | Sommers |
| 2020/0248814 A1 | 8/2020 | Schubert et al. |

* cited by examiner

CERAMIC RUNNER SEAL ASSEMBLY WITH COMPLIANT HOLDER

FIELD OF THE DISCLOSURE

The present disclosure relates generally to gas turbine engines, and more specifically to seal assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Seals and seal assemblies may be used to isolate cavities of different pressure regions in gas turbine engines. As an example, a seal assembly may be used to seal a lubrication sump from higher pressure and temperature airflows elsewhere in the engine, such that oil is retained in the sump and not permitted to migrate to other regions of the engine.

A typical seal assembly may include a seal ring engaged with a runner to form the seal. The runner may be carried by a runner mount that is coupled to a rotatable shaft. Some existing runner mounts hold the runner in place by contacting both a radially inner and a radially outer surface of the runner. Other runner mounts may engage an outer diameter of the seal ring. These runner mount designs can lead to excessive stresses in the seal ring, runner, and/or the runner mount. Improvements in runner mount designs may therefore desirable.

SUMMARY

The present disclosure may comprise one or more of the following features and combinations thereof.

According to an aspect of the present disclosure, a gas turbine engine includes a housing assembly, a shaft, and a seal assembly. The housing assembly is arranged circumferential around an axis. The shaft extends axially along the axis and is configured to rotate about the axis relative to the housing assembly. The seal assembly is coupled to the shaft for rotation with the shaft about the axis. The seal assembly is configured to block fluid communication between the housing assembly and the shaft.

In some embodiments, the seal assembly includes a ceramic runner, a carbon seal, and a compliant holder. The ceramic runner extends circumferentially about the axis. The carbon seal ring extends circumferentially around the ceramic runner and engages the housing assembly. The compliant holder is configured to support the ceramic runner radially relative to the axis. The compliant holder may include a first holder and a second holder. The first holder includes a first annular band and a plurality of first fingers that are cantilevered axially away from the first annular band toward the second holder. The second holder includes a second annular band and a plurality of second fingers that are cantilevered axially away from the second annular band toward the first holder. The plurality of first fingers and the plurality of second fingers engage an inner diameter of the ceramic runner and are configured to elastically deform during use of the gas turbine engine to allow for radial growth between the compliant holder and the ceramic runner.

In some embodiments, each of the plurality of first fingers includes a finger body and a finger pad. The finger body has a first end coupled with the first annular band and a terminating second end spaced apart axially from the first end. The finger pad extends radially outward away from the terminating second end and engages the inner diameter of the ceramic runner.

In some embodiments, each of the plurality of first fingers are located circumferentially between neighboring pairs of the plurality of second fingers.

In some embodiments, each of the plurality of first fingers includes an inner radial surface with a continuously or discretely varying radius, the inner radial surface has a first portion with a first radius of curvature and a second portion having a second radius of curvature. The second radius of curvature is less than the first radius of curvature. The second portion of the inner radial surface of each of the plurality of first fingers is directly connected with the first annular band.

In some embodiments, the first annular band is formed to include an annular groove that extends axially into the first annular band. The plurality of first fingers are located radially inward of the annular groove. A portion of the first annular band is located radially outward of the annular groove engages an axial face of the ceramic runner.

In some embodiments, the seal assembly further includes a seal located in the annular groove. The seal engages the first annular band and the ceramic runner.

In some embodiments, the compliant holder further includes a spacer located axially between and engaged with the first holder and the second holder to locate the first holder axially relative to the second holder.

In some embodiments, the compliant holder further includes a first pin and a second pin. The first pin extends into the first holder and the spacer and the second pin extends into the second holder and the spacer to locate the plurality of first fingers included in the first holder circumferentially relative to the plurality of second fingers included in the second holder.

In some embodiments, the first holder further includes a first locator ring that is formed to include an aperture that extends axially into the first locator ring. The second holder includes a second locator ring formed to include a tab that extends axially away from the second locator ring and extends into the aperture to locate the first holder circumferentially relative to the second holder.

According to another aspect of the disclosure, a seal assembly adapted for use with a gas turbine engine includes a runner and a compliant holder. The runner extends circumferentially about an axis. The compliant holder is configured to support the runner radially relative to the axis. The compliant holder includes a first holder and a second holder. The first holder includes a first annular band and a plurality of first fingers that are cantilevered axially away from the first annular band toward the second holder. The second holder includes a second annular band and a plurality of second fingers that are cantilevered axially away from the second annular band toward the first holder. The plurality of first fingers and the plurality of second fingers engage an inner diameter of the runner.

In some embodiments, the seal assembly includes a seal. The seal extends circumferentially around the runner.

In some embodiments, each of the plurality of first fingers includes a finger body and a finger pad. The finger body has a first end coupled with the first annular band and a terminating second end spaced apart axially from the first end. The finger pad extends radially outward away from the terminating second end and engages the inner diameter of the ceramic runner. In some embodiments, each of the plurality of first fingers are located circumferentially between neighboring pairs of the plurality of second fingers.

In some embodiments, each of the plurality of first fingers includes an inner radial surface that has a first portion and a second portion. The first portion has a first radius of curvature and the second portion has a second radius of curvature and the second radius of curvature being less than the first radius of curvature.

In some embodiments, the first annular band is formed to include an annular groove that extends axially into the first annular band. The plurality of first fingers are located radially inward of the annular groove. A portion of the first annular band located radially outward of the annular groove engages an axial face of the runner.

In some embodiments, the seal assembly further includes a seal located in the annular groove. The seal engages the first annular band and the runner.

In some embodiments, the compliant holder further includes a spacer. The spacer is located axially between and engaged with the first holder and the second holder to locate the first holder axially relative to the second holder.

In some embodiments, the compliant holder further includes a first pin and a second pin. The first pin extends into the first holder and the spacer and the second pin that extends into the second holder and the spacer to locate the plurality of first fingers included in the first holder circumferentially relative to the plurality of second fingers included in the second holder.

In some embodiments, the first holder is formed to include an aperture that extends axially into the first holder. The second holder is formed to include a tab that extends axially away from the second annular band and extends into the aperture to locate the first holder circumferentially relative to the second holder.

According to another aspect of the disclosure, a method includes a number of steps. The method may include arranging a compliant holder around a shaft, the compliant holder including a first holder that includes a first annular band and a plurality of first fingers that are cantilevered axially away from the first annular band and a second holder that includes a second annular band and a plurality of second fingers that are cantilevered axially away from the second annular band toward the first holder, and arranging a runner circumferentially around the compliant holder so that the runner is engaged by the plurality of first fingers and the plurality of second fingers and supported radially off the shaft by the plurality of first fingers and the plurality of second fingers.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

A seal assembly 20 in accordance with the present disclosure is adapted for use in a gas turbine engine 10 as shown in FIGS. 1-6. The seal assembly 20 is shown as assembled in a lubrication sump assembly of the gas turbine engine 10. The seal assembly 20 is configured to block fluid communication between cavities defined on opposite axial sides of the seal assembly 20.

Figure 1:
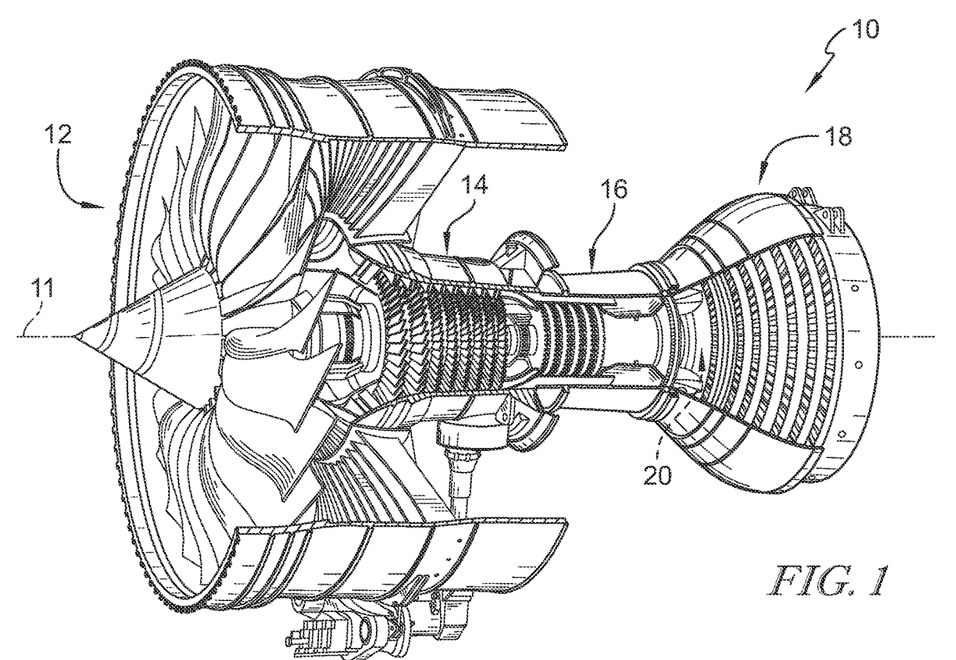
FIG. 1 is a cutaway view of a gas turbine engine having a fan, compressor, combustor, and turbine, the gas turbine engine further including a lubrication sump assembly having a seal assembly according to the present disclosure for sealing fluid cavities in the sump assembly.

The gas turbine engine 10, the illustrative aerospace gas turbine engine 10 includes a fan 12, a compressor 14, a combustor 16, and a turbine 18 as shown in FIG. 1. The fan 12 is driven to rotate about an axis 11 by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about the axis 11 and drive the compressor 14 and the fan 12.

Figure 2:
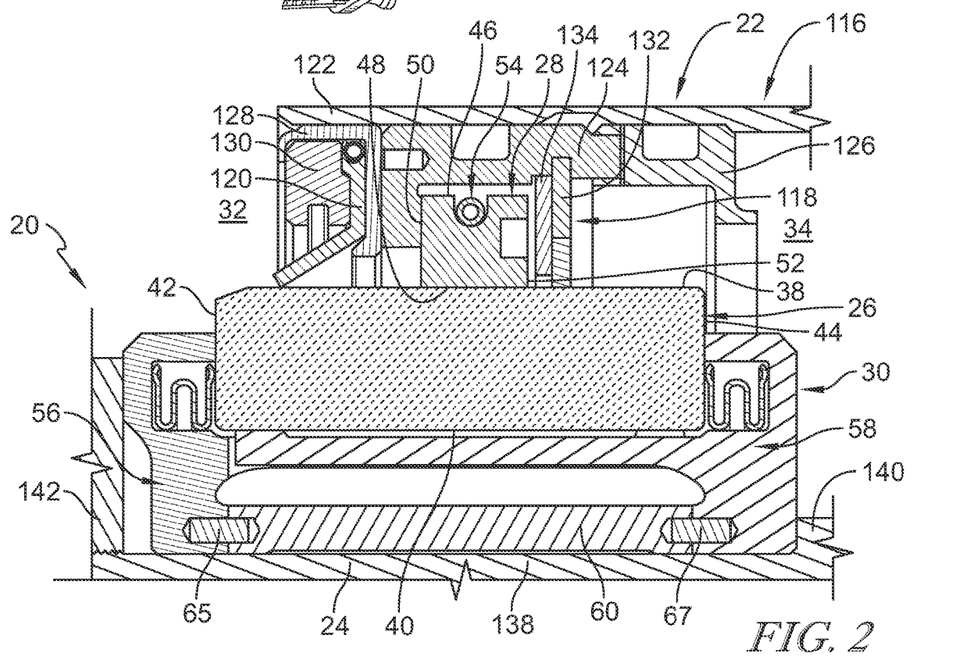
FIG. 2 is a schematic cross sectional view of the seal assembly used in the gas turbine engine of FIG. 1 showing that the seal assembly is assembled in the sump assembly and is coupled to a shaft for rotation with the shaft and engages a sump housing assembly to block fluid from flowing between the housing assembly and the shaft.

The gas turbine engine 10 further includes the seal assembly 20, a housing assembly 22, and a shaft 24 as shown in FIG. 2. The housing assembly 22 is arranged circumferential around the axis 11 and is fixed relative to the axis 11. The shaft 24 extends axially along the axis 11 and is configured to rotate about the axis 11 relative to the housing assembly 22. The seal assembly 20 is coupled to the shaft 24 for rotation with the shaft 24 about the axis 11 and blocks fluid communication between the housing assembly 22 and the shaft 24.

Figure 4:
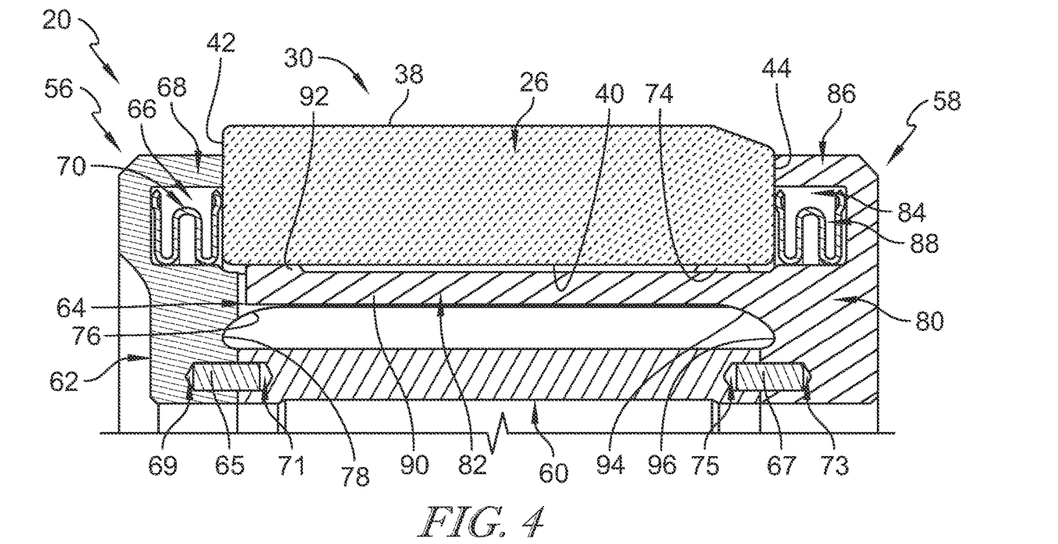
FIG. 4 is a schematic cross sectional view of the seal assembly of FIG. 2 showing that the fingers included in the first holder and the second holder of the compliant holder alternate with each other circumferentially and support the ceramic runner radially while allowing for radial growth and movement of the ceramic runner.

The seal assembly 20 seals a higher-pressure fluid cavity 32 from a lower pressure fluid cavity 34 as suggested in FIGS. 2 and 4. The higher and lower pressure fluid cavities 32, 34 may be at least partially disposed between the rotatable shaft 24 and the housing assembly 22.

The higher pressure fluid cavity 32 may be referred to as a first cavity, and may be, for example, a region of a rotating machine such as the gas turbine engine 10 that receives and directs higher pressure and/or higher temperature airflow. All or a portion of the higher-pressure fluid cavity 32 may comprise a buffer air chamber. The lower pressure fluid cavity 34 may be referred to as a second cavity, and may be, for example, a region of a rotating machine such as the gas turbine engine that receives and directs lower pressure and/or lower temperature airflow. The lower pressure cavity 34 may be a sump or bearing chamber.

Illustratively, the shaft 24 includes a shaft body 138, a flange 140, and a nut 142 as shown in FIG. 2. The flange 140 extends radially from the shaft body 138 and abuts the compliant holder 30. The nut 142 is threadingly engaged with the shaft body 138 and compresses the compliant holder 30 between the nut 142 and the flange 140.

Figure 3:
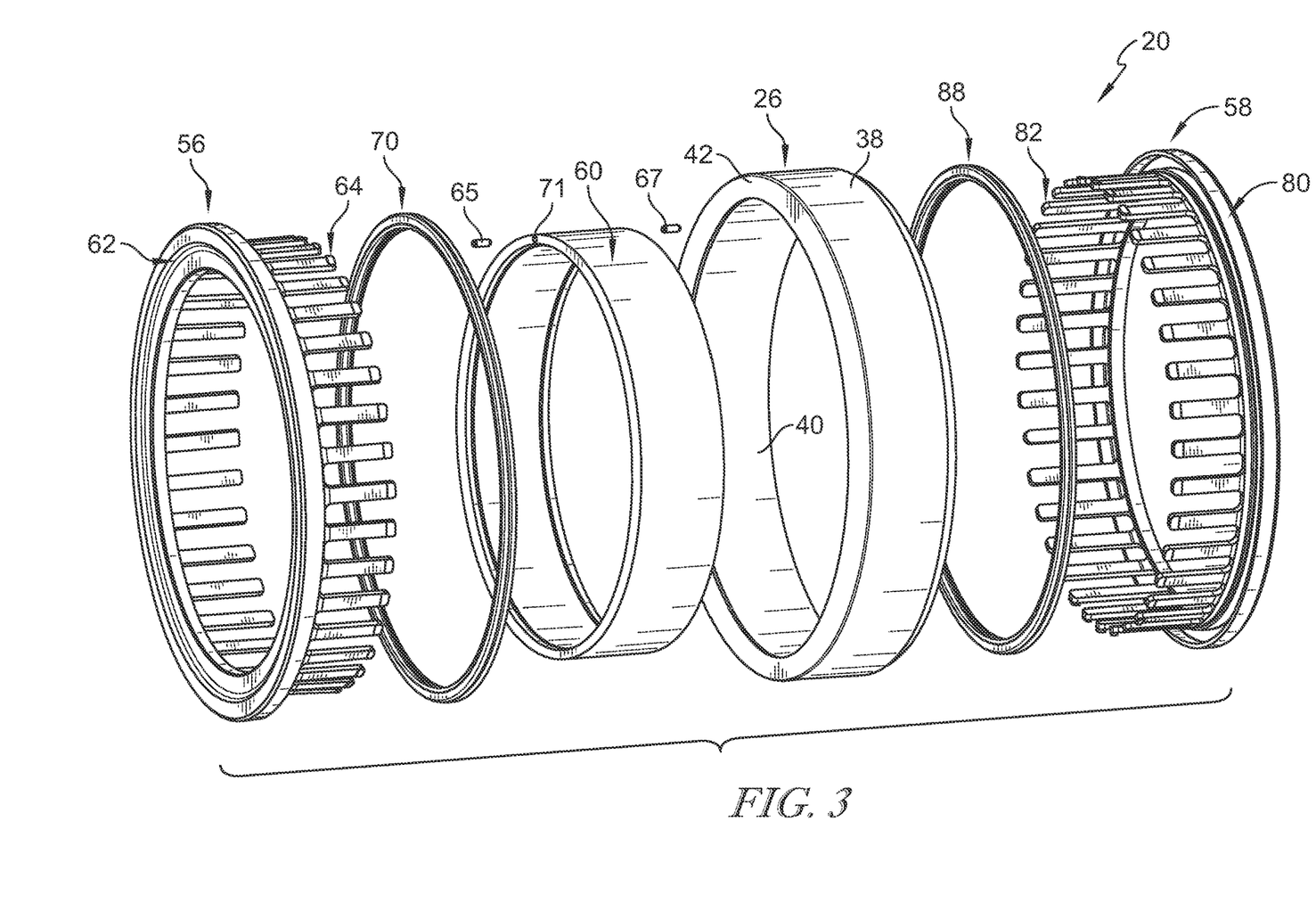
FIG. 3 is an exploded view of the seal assembly of FIG. 2 showing that the seal assembly includes a compliant holder having a first holder on the left, a second holder on the far right, a first seal, a spacer, a ceramic runner, and a second seal located between the first holder and the second holder of the compliant holder.

The seal assembly 20 includes a runner 26, a seal ring 28, and a compliant holder 30 as shown in FIGS. 2-4. The runner 26 is a ceramic runner that extends circumferentially about the axis 11. The seal ring 28 is a carbon seal ring and is arranged circumferentially around the runner 26 and engages runner 26 and the housing assembly 22 to block fluid from passing between the shaft 24 and the housing assembly 22. The compliant holder 30 supports the runner 26 radially relative to the axis 11 and is configured to deform elastically to allow for thermal growth mismatch between the components.

The runner 26 is an annular member that extends circumferentially around the axis 11 as shown in FIGS. 3 and 4. The runner 26 is radially spaced apart from the shaft 24 by the compliant holder 30. The runner 26 is supported by the compliant holder 30 which is coupled to the shaft 24 for rotation with the shaft. As a result, the runner 26 rotates with the shaft 24.

The runner 26 is a solid component as shown in FIGS. 2 and 4. The runner 26 includes an outer radial surface 38 having an outer diameter and an inner radial surface 40 having an inner diameter. The runner 26 further includes a fore surface 42 that extends between and interconnects the outer radial surface 38 and the inner radial surface 40 and an aft surface 44 that extends between and interconnects the outer radial surface 38 and the inner radial surface 40. The runner 26 illustratively comprises ceramic materials. In other embodiments, the runner 26 may or may not be ceramic and may comprise silicon carbide, silicon nitride, or alumina.

The seal ring 28 is sealingly engaged with the runner 26 such that the seal ring 28 is in contact with the runner 26 or in sufficient proximity to the runner 26 such that a seal is formed between the seal ring 28 and the runner 26 as shown in FIGS. 2 and 4. Illustratively, the seal ring 28 is a carbon seal. The seal ring 28 is sealingly engaged with the housing assembly 22. Illustratively, a fore surface of the seal ring 28 engages an axially aft facing surface of the housing assembly 22. In some embodiments, the seal ring 28 is an archbound seal. In some embodiments, the ring seal 28 has additional material configured to allow for rub in of the seal ring 28 to form its optimal shape in the assembly.

The seal ring 28 includes an outer radial surface 46, an inner radial surface 48, a fore surface 50, and an aft surface 52 as shown in FIGS. 2 and 4. Illustrative, the outer radial surface 46 is formed to define an annular groove that extends radially inward into the seal ring 28 and a garter spring 54 is received in the groove to maintain engagement of the seal ring 28 with the runner 26 across a predetermined range of rotational speeds of the shaft 24. The seal ring 28 and the runner 26 may be formed from materials having coefficients of thermal expansion that are matched to effect sealing engagement between the seal ring 28 and runner 26 over a predetermined range of operating temperatures.

The compliant holder 30 included in the seal assembly 20 includes a first holder 56, a second holder 58, and a spacer 60 as shown in FIGS. 3 and 4. The first holder 56 and the second holder 58 are each formed to include a plurality of fingers 64, 82 that cooperate to support the runner 26 radially and allow for radial thermal growth of the shaft 24, runner 26, and the seal ring 28. The spacer 60 is configured to locate the first holder 56 and the second holder 58 is axially spaced apart relation relative to one another.

Figure 5:
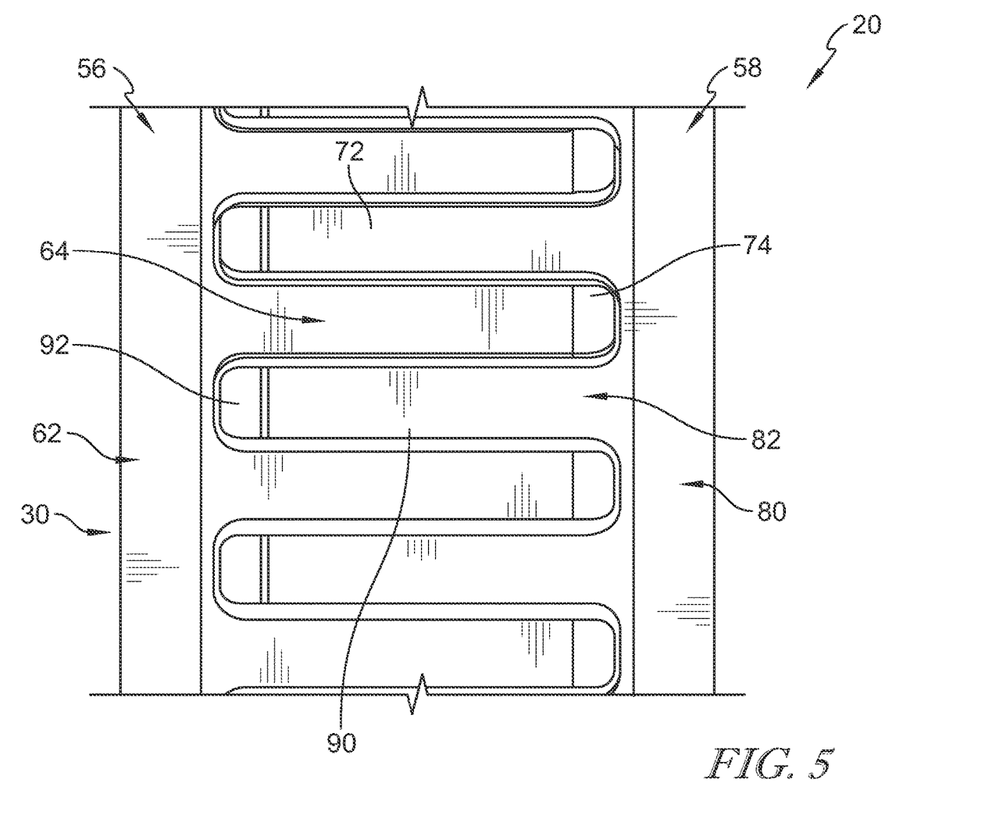
FIG. 5 is a side view of the seal assembly of FIG. 2 showing the fingers included in the first and second holders of the compliant holder fit between each other and alternate circumferentially to distribute the load of the ceramic runner.

The first holder 56 includes a first annular band 62 and the plurality of first fingers 64 that are cantilevered axially away from the first annular band 62 and extend toward the second holder 58 as shown in FIGS. 3-5. The first annular band 62 is formed to include an annular groove 66 that extends axially into the first annular band 62. A flange 68 of the first annular band 62 that defines and is located radially outward of the annular groove 66 engages the fore surface 42 of the runner 26. The first holder 56 further includes a seal 70, illustratively a W-seal, located in the groove 66. The seal 70 engages the first annular band 62 and the fore surface 42 of the runner 26 to block fluid from passing between the first holder 56 and the runner 26. In other embodiments, the seal 70 may include any number of other suitable shaped and style of seals such, as for example, U or V shaped seals. The seal 70 may be made of metal or other material suitable for high temperatures.

Each of the plurality of first fingers 64 includes a finger body 72 and a finger pad 74 as shown in FIGS. 4 and 5. The finger body 72 has a first end coupled with the first annular band 62 and a terminating second end spaced apart axially from the first end. The finger pad 74 extends radially outward away from the terminating second end of the corresponding finger body 72 and engages the inner radial surface 40 of the runner 26. Illustratively, the plurality of first fingers 64 are located radially inward of the annular groove 66.

Each of the plurality of first fingers 64 includes an inner radial surface that has a first portion 76 with a first radius of curvature and a second portion 78 having a second radius of curvature as shown in FIG. 4. The second radius of curvature is less than the first radius of curvature. The smaller radius of curvature nearest the first annular band 62 and the larger radius of curvature further from the first annular band 62 may reduce stress concentrations along the interface between the first fingers 64 and the first annular band 62 while allowing a low radial dimension of the curved surface.

The second portion 78 of the inner radial surface of each of the plurality of first fingers 64 is directly connected with the first annular band 62. The first radius of curvature is a constant radius of curvature in some embodiments. The second radius of curvature is a constant radius of curvature in some embodiments. The first radius of curvature is varying radius of curvature in some embodiments. The second radius of curvature is a varying radius of curvature in some embodiments. In some embodiments, the fingers include a gradually decreasing radius with a plurality or infinite portions. The plurality of or infinite portions including at least the first portion 76 and the second portion 78.

The curvature feature of the fingers results in the stress riser value of the radius changing as the cantilever finger body thickens toward the mounting end of the finger body. At the portion that starts the transition, the radius is large which provides a small stress riser in the portion of the cantilever finger body that is thin and is prone to a higher stress. As the radius thickens along the finger body in the axially direction, the radius can continue to drop to a smaller size which can maintains the stress constant and/or at a desired level. The small portion of the radius is located in a very thick section of the finger body and, thus, at low stress. This varying radius design provides fingers that are very compliant (thin radial section) without overstressing the fingers.

The second holder 58 includes a second annular band 80 and the plurality of second fingers 82 that are cantilevered axially away from the second annular band 80 and extend toward the first holder 56 as shown in FIGS. 3-5. The second annular band 80 is formed to include an annular groove 84 that extends axially into the second annular band 80. A flange 86 of the second annular band 80 that defines and is located radially outward of the annular groove 84 engages the aft surface 44 of the runner 26. The second holder 58 further includes a seal 88, illustratively a W-seal, located in the groove 84. The seal 88 engages the second annular band 80 and the aft surface 44 of the runner 26 to block fluid from passing between the second holder 58 and the runner 26. In other embodiments, the seal 88 may include any number of other suitable shaped and style of seals such as, for example, U or V shaped seals. The seal 88 may be made of metal or other material suitable for high temperatures. In some embodiments, seal 70 or seal 88 may be omitted and only one side of the assembly is sealed by seal 70 or 88.

Each of the plurality of second fingers 82 includes a finger body 90 and a finger pad 92 as shown in FIGS. 4 and 5. The finger body 90 has a first end coupled with the second annular band 80 and a terminating second end spaced apart axially from the first end. The finger pad 92 extends radially outward away from the terminating second end of the corresponding finger body 90 and engages the inner radial surface 40 of the runner 26. Illustratively, the plurality of second fingers 82 are located radially inward of the annular groove 84.

Each of the plurality of second fingers 82 includes an inner radial surface that has a first portion 94 with a first radius of curvature and a second portion 96 having a second radius of curvature as shown in FIG. 4. The second radius of curvature is less than the first radius of curvature. The arrangement of the smaller radius of curvature nearest the second annular band 80 and the larger radius of curvature further from the second annular band 80 may reduce stress concentrations along the interface between the second fingers 82 and the second annular band 80 while allowing a low radial dimension of the curved surface.

The second portion 96 of the inner radial surface of each of the plurality of second fingers 82 is directly connected with the second annular band 80. The first radius of curvature is a constant radius of curvature in some embodiments. The second radius of curvature is a constant radius of curvature in some embodiments. The first radius of curvature is varying radius of curvature in some embodiments. The second radius of curvature is a varying radius of curvature in some embodiments.

The plurality of first fingers 64 are spaced apart circumferentially from one another as shown in FIGS. 3 and 5. The plurality of second fingers 82 are spaced apart circumferentially from one another. Each of the plurality of first fingers 64 are located circumferentially between neighboring pairs of the plurality of second fingers 82 and vice-versa as shown in FIG. 5. The plurality of first fingers 64 and the plurality of second fingers 82 engage an inner diameter of the runner 26 and are configured to elastically deform during use of the gas turbine engine 10 to allow for radial growth between the compliant holder 30 and the runner 26.

In particular, the finger pads 74 of the first fingers 64 and the finger pads 92 of the second fingers 82 support the runner 26 radially above the finger bodies 72, 90 to form a radial gap between the fingers 64, 82 while the gas turbine engine 10 is not operating or operating at relatively cool temperatures. As the components of the gas turbine engine 10 heat during use of the engine 10, the components of the seal assembly 20, shaft 24, and housing assembly 22 expand at different rates due to different coefficients of thermal expansion. The cantilevered fingers 64, 82 are free to deform radially inward to allow for the radial growth of the components. For example, the compliant holder 30 may grow radially outward more than the runner 26. The fingers 64, 82 bend inwardly to allow the runner 26 to generally maintain its relative radial position.

The spacer 60 is an annular component that extends circumferentially around the axis 11 as shown in FIG. 3. The spacer is located radially inward of the fingers 64, 82 and engage the first holder 56 and the second holder 58. The spacer 60 is sized axially to locate the first holder 56 relative to the second holder 58 at a predetermined distance. The spacer 60 is coupled with the shaft 24 for rotation with the shaft 24.

Figure 6:
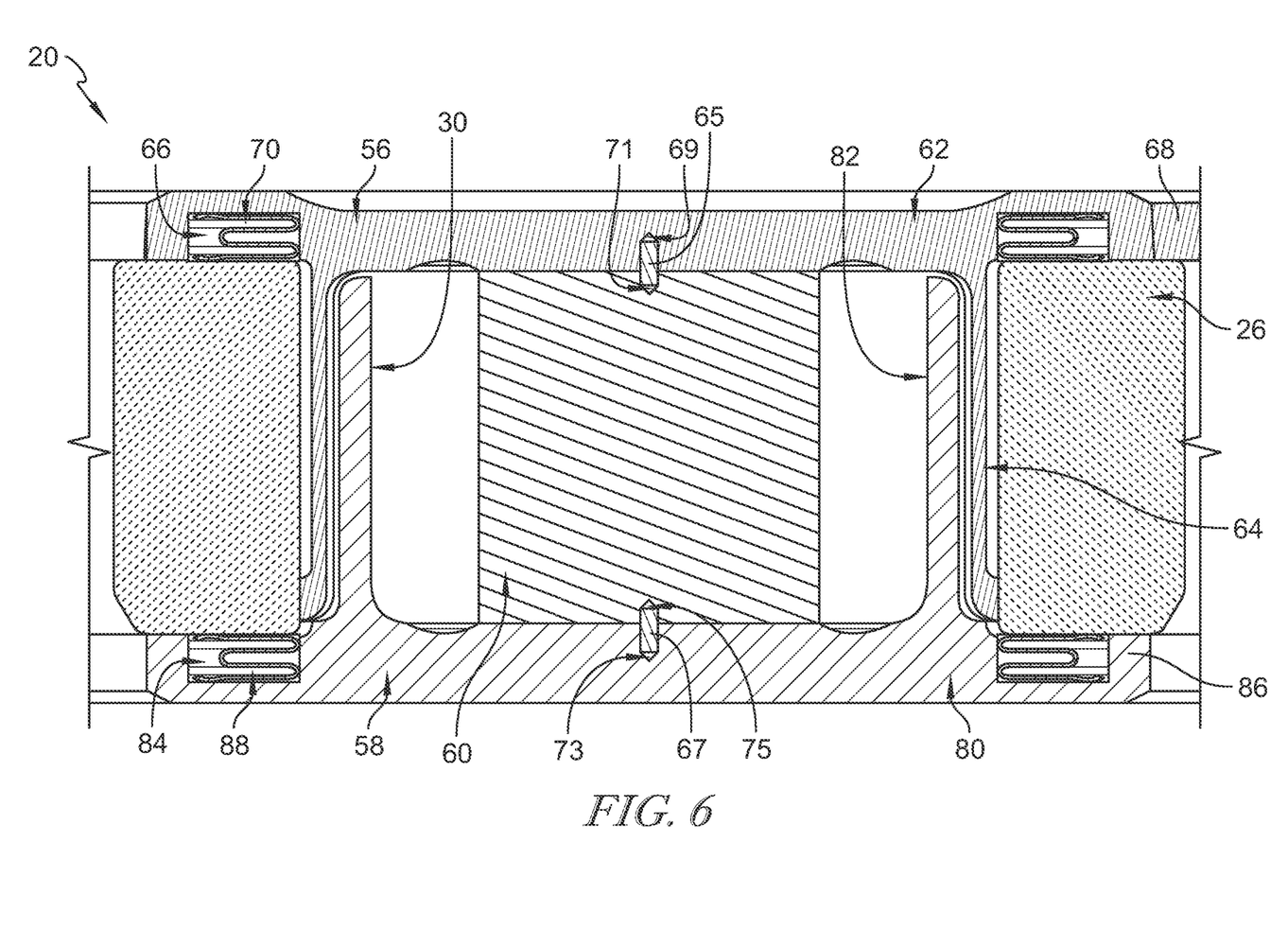
FIG. 6 is a schematic cross sectional view of the seal assembly of FIG. 2 showing that the compliant holder includes pins that extend into the first holder, the spacer, and the second holder to locate the components and, specifically, the fingers, relative to each other circumferentially.

In the illustrative embodiment, the compliant holder 30 further includes a first pin 65 and a second pin 67 as shown in FIGS. 4 and 6. The first pin 65 extends into an aperture 69 in the first holder 56 and into an aperture 71 formed in the spacer 60. The second pin 67 extends into an aperture 73 formed in the second holder 58 and into an aperture 75 formed in the spacer 60. The first pin 65 and the second pin 67 cooperate to locate the plurality of first fingers 64 included in first holder 56 circumferentially relative to the plurality of second fingers 82 included in the second holder 58 as shown in FIGS. 5 and 6. The first fingers 64 are spaced apart entirely from the second fingers 82 in the illustrative embodiment.

Pin 65, 67 are optional and may be omitted in other embodiments. In some embodiments, other suitable anti-rotation features are used. In some embodiments, friction is used to block circumferential rotation of the components. In some embodiments, flange 140 and nut 142 cooperate with the seal assembly to block or limit rotation of the components.

Illustratively, the housing assembly 22 includes a housing body 116, a seal retainer 118, and a lip seal 120 as shown in FIG. 2. The housing body 116 is formed of one or more components and illustratively is formed by an outer housing 122, a forward housing segment 124, an aft housing segment 126, seal channel 128, and insert 130. The seal retainer 118 includes a snap ring 132 and a back plate 134. The snap ring 132 extends into the forward housing segment 124 and is located adjacent the back plate 134 to maintain the back plate 134 in position adjacent the seal ring 28.

The lip seal 120 is axially displaced from the seal 28 and may comprise a flexible and/or semi-rigid material. The lip seal 120 may comprise polytetrafluoroethylene, TEFLON™, or a TEFLON™ derivative material. The lip seal 120 may be an annular flexible ring that is flexed when positioned relative to the runner 26 (i.e. the lip seal 120 may be flexed by contact with the runner 26). In some embodiments the annular lip seal 120 may be formed as a curved member having a J-shaped cross section. The annular lip seal 120 may have a curvilinear face surface that engages the outer radial surface 38 of the runner 26. The curvilinear face surface may extend from an axially-facing surface to a radially-facing surface, and the radially-facing surface engages the radially outward facing seal surface 38 of the runner 38.

Another embodiment of a seal assembly 220 in accordance with the present disclosure is shown in FIG. 7-10. The seal assembly 220 is substantially similar to the seal assembly 20 shown in FIGS. 1-6 and described herein. Accordingly, similar reference numbers in the 200 series indicate features that are common between the seal assembly 20 and the seal assembly 220. The description of the seal assembly 20 is incorporated by reference to apply to the seal assembly 220, except in instances when it conflicts with the specific description and the drawings of the seal assembly 220.

Figure 7:
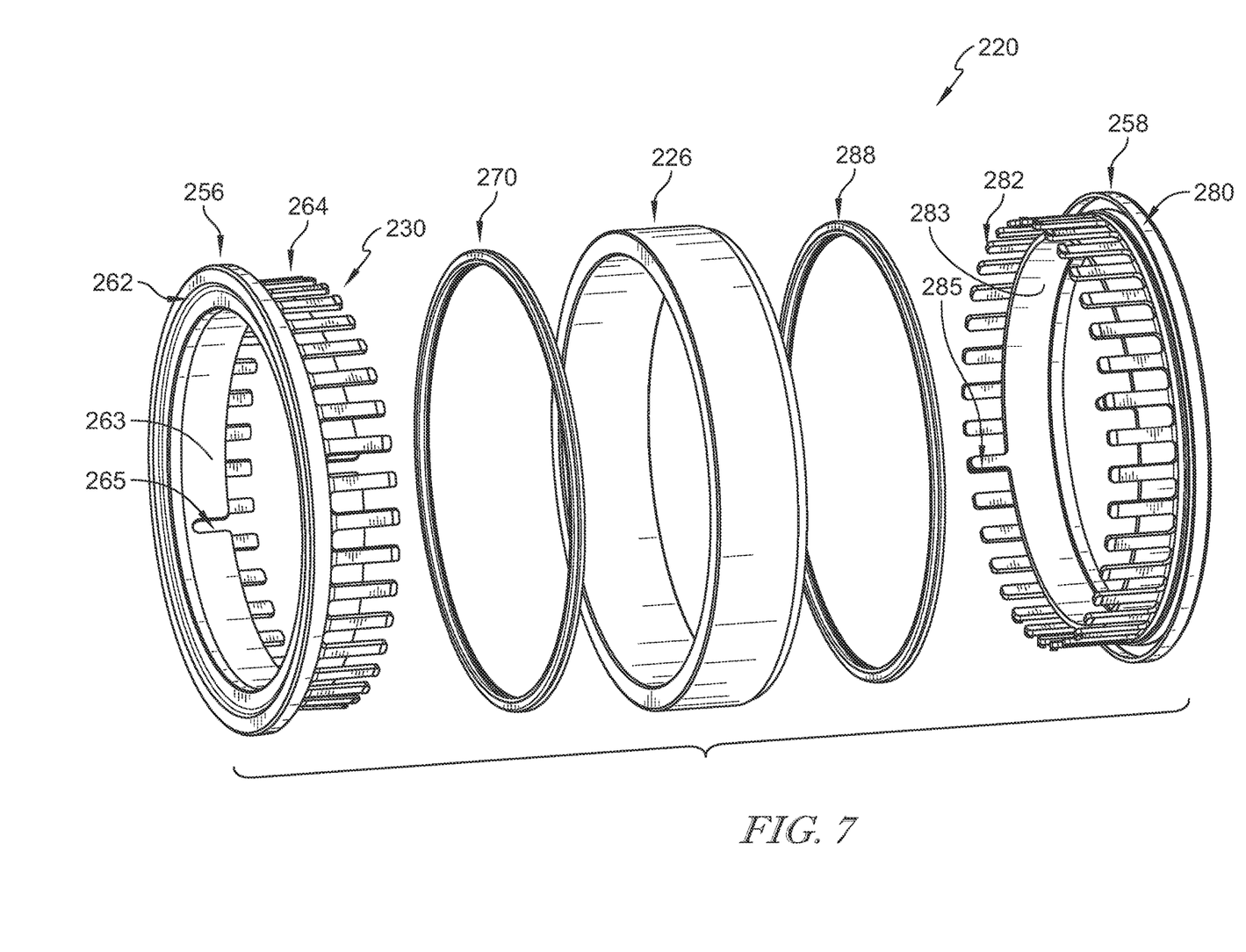
FIG. 7 is an exploded view of another embodiment of a seal assembly adapted for use in the gas turbine engine of FIG. 1 showing the seal assembly includes a compliant holder having a first holder on the left and a second holder on the far right, a ceramic runner configured to be supported on the compliant holder, and two ring seals adapted to seal between the compliant holder and the ceramic runner.

Notably, the seal assembly 220 does not includes a spacer, such as spacer 60 of seal assembly 20. Moreover, the seal assembly 220 includes a tab and slot feature that interlocks the first and second holders 256, 258 to locate the components circumferentially in place of pins 65, 67 of seal assembly 220.

The seal assembly 220 includes a runner 226 and a compliant holder 230 as shown in FIGS. 7-10. The seal assembly 220 may further include a seal ring. The runner 226 is similar to the runner 26 and the seal ring is similar to the seal ring 28.

The compliant holder 230 included in the seal assembly 220 includes a first holder 256 and a second holder 258 as shown in FIGS. 7-10. The first holder 256 includes a first annular band 262, a first locator ring 263, and a plurality of first fingers 264 that are cantilevered axially away from the first annular band 262 and extend toward the second holder 258. The first locator ring 263 extends axially away from the first annular band 262 toward the second holder 258. The first holder 256 further includes a seal 270, illustratively a W-seal.

Figure 8:
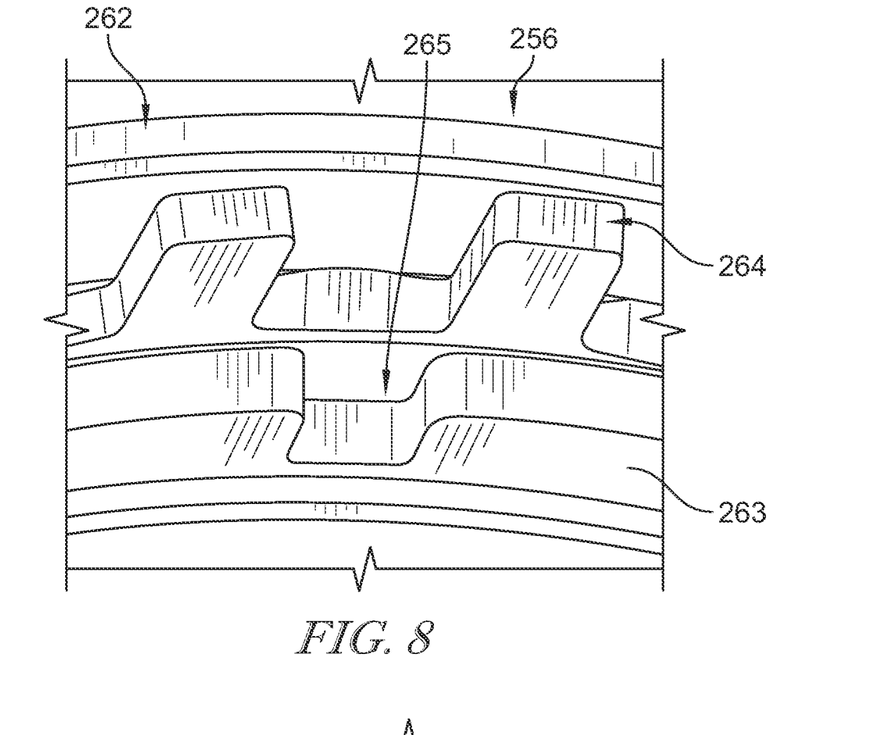
FIG. 8 is an enlarged perspective view of the first holder included in the seal assembly of FIG. 7 showing that the first holder includes a locator slot configured to receive a locator tab included in the second holder to circumferentially locate the components, specifically the fingers, relative to one another.
Figure 9:
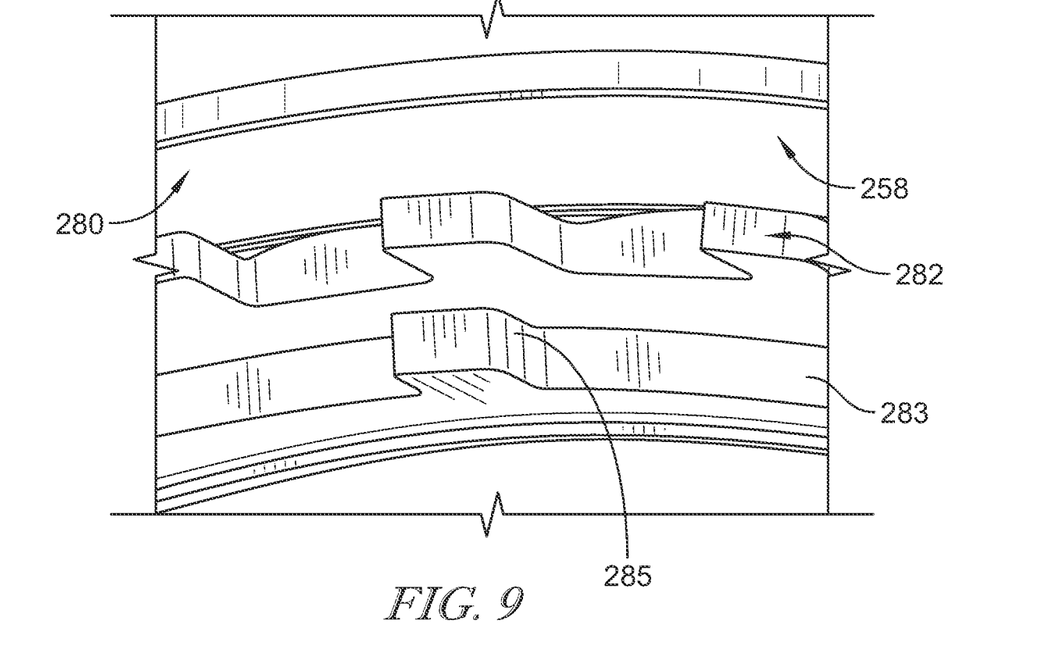
FIG. 9 is an enlarged perspective view of the second holder included in the seal assembly of FIG. 7 showing that the second holder includes the locator tab configured to be received in the locator slot included in the first holder to circumferentially locate the components, specifically the fingers, relative to one another.
Figure 10:
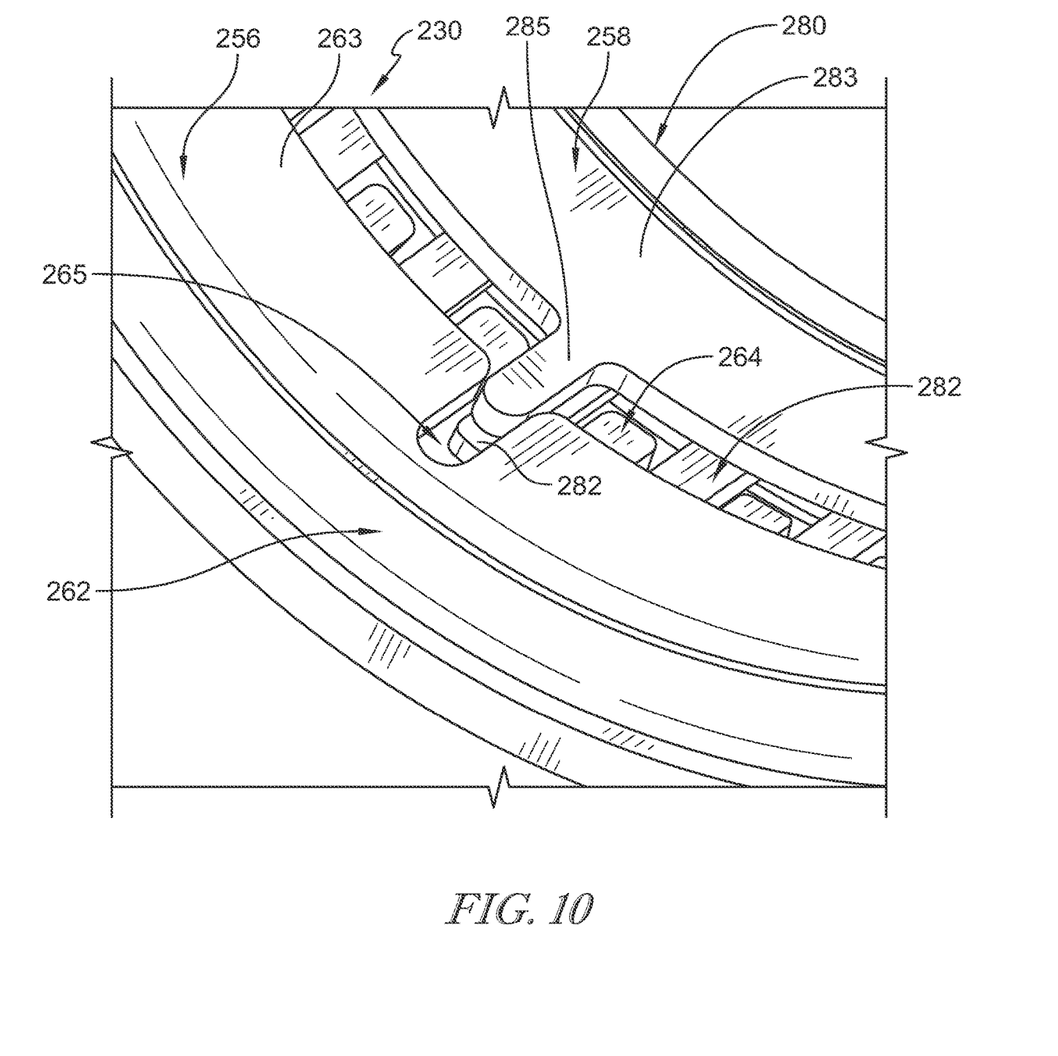
FIG. 10 is an enlarged perspective view of the compliant holder included in the seal assembly of FIG. 7 showing the locator tab of the second holder being inserted into the locator slot formed in the first holder to locate the components circumferentially relative to one another.

The first locator ring 263 is configured to engage a second locator ring 283 of the second holder 258 to axially locate the first holder 256 relative to the second holder 258. The first locator ring 263 is located radially inward of the fingers 264. The first locator ring 263 is formed to include an aperture 265 (sometimes a slot or cutout) that extends axially into the first locator ring 263.

The second holder 258 includes a second annular band 280, a second locator ring 283, and a plurality of second fingers 282 that are cantilevered axially away from the second annular band 280 and extend toward the first holder 256 as shown in FIG. 7. The second locator ring 283 extends axially away from the second annular band 280 toward the first holder 256. The second holder 258 further includes a seal 288, illustratively a W-seal.

The second locator ring 283 is located radially inward of the fingers 282 as shown in FIGS. 7-10. The second locator ring 283 is formed to include a tab 285 that extends into the aperture 265 of the first locator ring 263 to locate the first holder 256 circumferentially relative to the second holder 258 so that circumferential spacing is maintained between the plurality of first fingers 264 and the plurality of second fingers 282.

Circumferential carbon seal assemblies incorporating a ceramic runner may provide advantages relative to current designs that use a steel oil cooled runner. The ceramic runner may provide a better match of the coefficient of thermal expansion with the carbon seal element. The improved match of coefficient of thermal expansion may provide tighter radial clearance between the two features over the operating range of the gas turbine engine. The tighter clearance may minimize air flow into the bearing chamber and inhibit oil leakage externally from the bearing chamber. The ceramic runner assembly may reduce oil flow and oil cooling resulting in a smaller oil pump and cooler. There is no cooling oil on the ceramic runner in the illustrative embodiment.

The present disclosure provides a means to support the ceramic runner 26. The holder 30 compensates for the thermal expansion mismatch between the ceramic runner 26 and the holder 30/shaft 24 without imparting high stresses/deflections on the ceramic runner 26 or the holder 30.

The present disclosure may result in reduced edge loading on the pilot diameter between the holder 30 and the ceramic runner 26. The holder 30 may comprise titanium which may be prone to wear. Edge loading can accelerate wear and lead to lack of control of the radial position of the runner 26. Alternatively, the holder 30 may be made of steel and still benefit from a reduced wear rate.

The features of the present disclosure may also allow for a lip seal 120 discourager on the surface of the ceramic runner 26. The holder 30 has a low axial and radial profile that allows the lip seal 120 to have enough space to remain in contact with the ceramic runner 26. The seal assemblies 20, 220 may also reduce the rate of ceramic failure during assembly because the seal assemblies 20, 220 do not rely on press fitting of the runner 26 and, instead, the holder 30 is compliant.

The seal assemblies 20, 220 are made with interlocking halves that incorporate a cantilevered finger system that are optimized for compliance and stress. The steel holder 30 may be designed for applications with a very limited radial and axial space envelope. The ceramic runner 26 is piloted in the inner diameter to allow for more room to incorporate the lip seal discourager.

By incorporating the slotted fingers in the present disclosure, radial compliance of the runner 26 may be softened by reducing the hoop integrity of the runner 26 which reduces thermal expansion stresses. This compliance approach softens the system enough to allow the use of the stiffer and more wear resistant steel components.

The fingers 64, 82 incorporate a large fillet radius 76, 94 near the end of the beam in the highest stress area to minimize the stress concentration effects. The beam 72, 90 then transitions to a radially thick area as the radius 78, 96 gets smaller toward the end of the beam 72, 90 to minimize the stress due to the higher stress concentration. By having two interlocking halves 56, 58 the ceramic runner 26 is supported at two ends thereby providing sufficient stability.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
   a housing assembly arranged circumferential around an axis,
   a shaft that extends axially along the axis and configured to rotate about the axis relative to the housing assembly, and
   a seal assembly coupled to the shaft for rotation with the shaft about the axis, the seal assembly configured to block fluid communication between the housing assembly and the shaft, the seal assembly including:
   a ceramic runner that extends circumferentially about the axis,
   a carbon seal ring that extends circumferentially around the ceramic runner and engages the housing assembly, and
   a compliant holder configured to support the ceramic runner radially relative to the axis, the compliant holder including a first holder and a second holder, the first holder includes a first annular band and a plurality of first fingers that are cantilevered axially away from the first annular band toward the second holder, the second holder includes a second annular band and a plurality of second fingers that are cantilevered axially away from the second annular band toward the first holder, and the plurality of first fingers and the plurality of second fingers engage an inner diameter of the ceramic runner and are configured to elastically deform during use of the gas turbine engine to allow for radial growth between the compliant holder and the ceramic runner.

2. The gas turbine engine of claim 1, wherein each of the plurality of first fingers includes a finger body and a finger pad, the finger body has a first end coupled with the first annular band and a terminating second end spaced apart axially from the first end, and the finger pad extends radially outward away from the terminating second end and engages the inner diameter of the ceramic runner.

3. The gas turbine engine of claim 2, wherein each of the plurality of first fingers are located circumferentially between neighboring pairs of the plurality of second fingers.

4. The gas turbine engine of claim 1, wherein each of the plurality of first fingers includes an inner radial surface with a continuously or discretely varying radius, the inner radial surface has a first portion with a first radius of curvature and a second portion having a second radius of curvature, the second radius of curvature being less than the first radius of curvature, and the second portion of the inner radial surface of each of the plurality of first fingers is directly connected with the first annular band.

5. The gas turbine engine of claim 1, wherein the first annular band is formed to include an annular groove that extends axially into the first annular band, the plurality of first fingers are located radially inward of the annular groove, and a portion of the first annular band located radially outward of the annular groove engages an axial face of the ceramic runner.

6. The gas turbine engine of claim 5, wherein the seal assembly further includes a seal located in the annular groove and the seal engages the first annular band and the ceramic runner.

7. The gas turbine engine of claim 1, wherein the compliant holder further includes a spacer located axially between and engaged with the first holder and the second holder to locate the first holder axially relative to the second holder.

8. The gas turbine engine of claim 7, wherein the compliant holder further includes a first pin that extends into the first holder and the spacer and a second pin that extends into the second holder and the spacer to locate the plurality of first fingers included in the first holder circumferentially relative to the plurality of second fingers included in the second holder.

9. The gas turbine engine of claim 1, wherein the first holder further includes a first locator ring that is formed to include an aperture that extends axially into the first locator ring and the second holder includes a second locator ring formed to include a tab that extends axially away from the second locator ring and extends into the aperture to locate the first holder circumferentially relative to the second holder.

10. A seal assembly adapted for use with a gas turbine engine, the seal assembly comprising
    a runner that extends circumferentially about an axis, and
    a compliant holder configured to support the runner radially relative to the axis, the compliant holder including a first holder and a second holder, the first holder includes a first annular band and a plurality of first fingers that are cantilevered axially away from the first annular band toward the second holder, the second holder includes a second annular band and a plurality of second fingers that are cantilevered axially away from the second annular band toward the first holder, and the plurality of first fingers and the plurality of second fingers engage an inner diameter of the runner.

11. The seal assembly of claim 10, further comprising a seal that extends circumferentially around the runner.

12. The seal assembly of claim 10, wherein each of the plurality of first fingers includes a finger body and a finger pad, the finger body has a first end coupled with the first annular band and a terminating second end spaced apart axially from the first end, and the finger pad extends radially outward away from the terminating second end and engages the inner diameter of the runner.

13. The seal assembly of claim 12, wherein each of the plurality of first fingers are located circumferentially between neighboring pairs of the plurality of second fingers.

14. The seal assembly of claim 10, wherein each of the plurality of first fingers includes an inner radial surface that has a first portion with a first radius of curvature and a second portion having a second radius of curvature and the second radius of curvature being less than the first radius of curvature.

15. The seal assembly of claim 10, wherein the first annular band is formed to include an annular groove that extends axially into the first annular band, the plurality of first fingers are located radially inward of the annular groove, and a portion of the first annular band located radially outward of the annular groove engages an axial face of the runner.

16. The seal assembly of claim 15, wherein the seal assembly further includes a seal located in the annular groove and the seal engages the first annular band and the runner.

17. The seal assembly of claim 10, wherein the compliant holder further includes a spacer located axially between and engaged with the first holder and the second holder to locate the first holder axially relative to the second holder.

18. The seal assembly of claim 17, wherein the compliant holder further includes a first pin that extends into the first holder and the spacer and a second pin that extends into the second holder and the spacer to locate the plurality of first fingers included in the first holder circumferentially relative to the plurality of second fingers included in the second holder.

19. The seal assembly of claim 10, wherein the first holder is formed to include an aperture that extends axially into the first holder and the second holder is formed to include a tab that extends axially away from the second annular band and extends into the aperture to locate the first holder circumferentially relative to the second holder.

20. A method comprising
arranging a compliant holder around a shaft, the compliant holder including a first holder that includes a first annular band and a plurality of first fingers that are cantilevered axially away from the first annular band and a second holder that includes a second annular band and a plurality of second fingers that are cantilevered axially away from the second annular band toward the first holder, and
arranging a runner circumferentially around the compliant holder so that the runner is engaged by the plurality of first fingers and the plurality of second fingers and supported radially off the shaft by the plurality of first fingers and the plurality of second fingers.

* * * * *